March 12, 1963     C. F. SUDMAN     3,081,077
SEAT CUSHION AND METHOD OF MAKING SAME
Filed Feb. 16, 1960     4 Sheets—Sheet 1
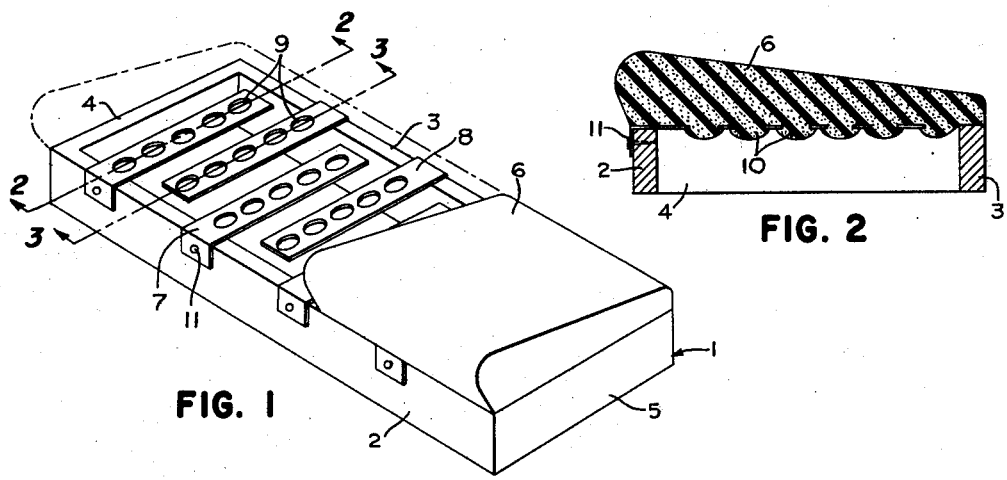
FIG. 1
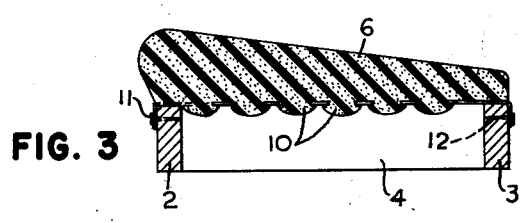
FIG. 2
FIG. 3
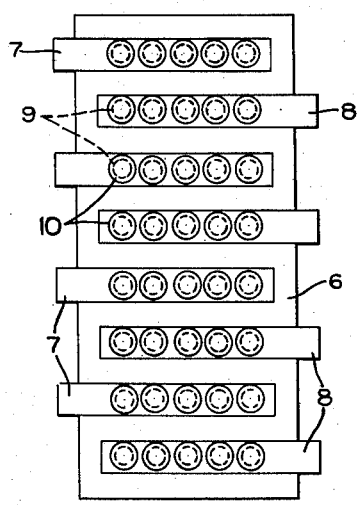
FIG. 4
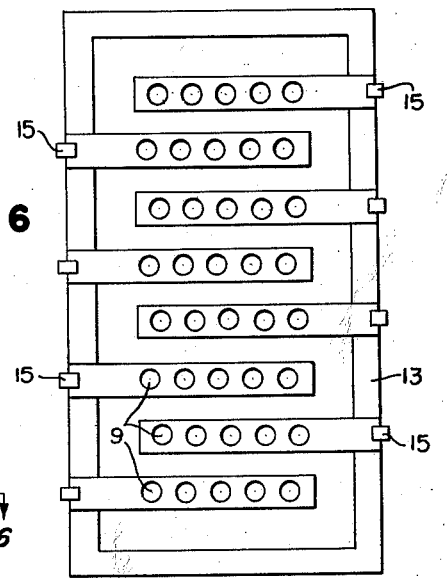
FIG. 6
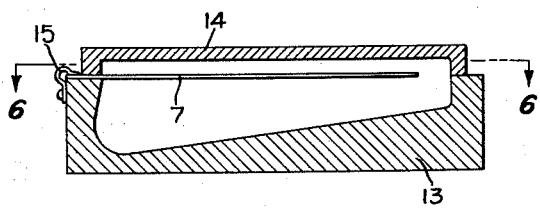
FIG. 5
INVENTOR.
CHARLES F. SUDMAN
BY
J. B. Holden
ATTORNEY

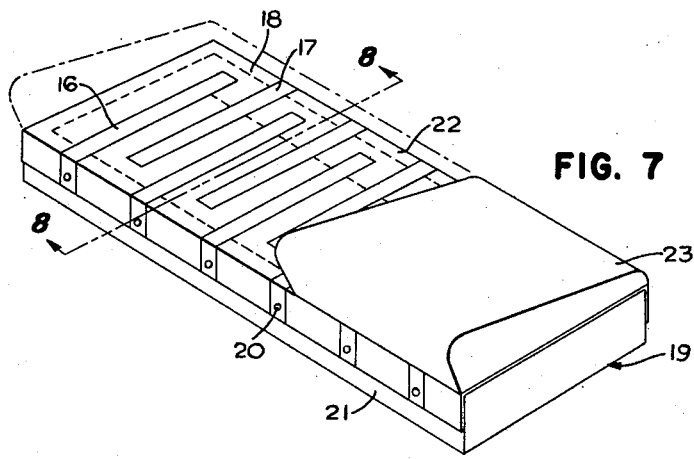
FIG. 7
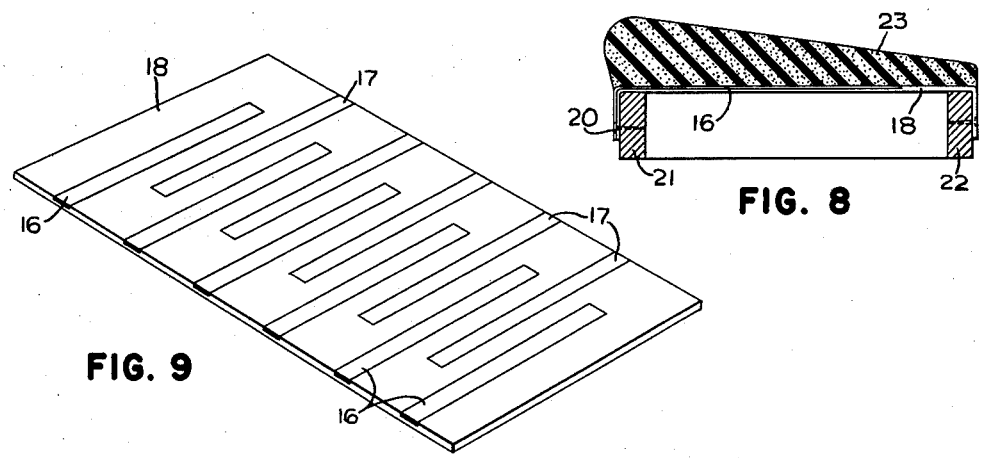
FIG. 8
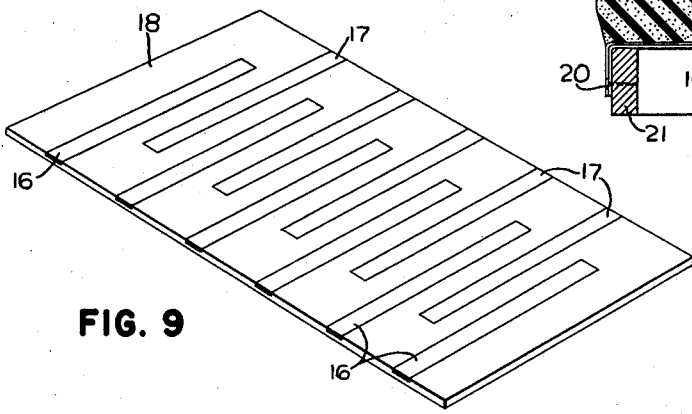
FIG. 9
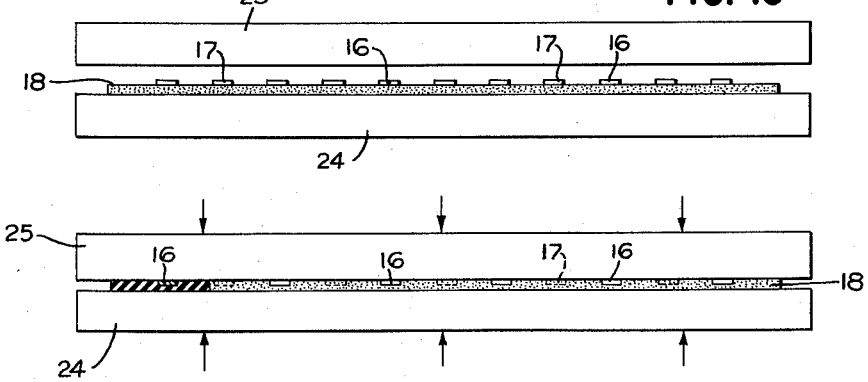
FIG. 10
FIG. 11
INVENTOR.
CHARLES F. SUDMAN
BY
J. B. Holden
ATTORNEY March 12, 1963    C. F. SUDMAN    3,081,077
SEAT CUSHION AND METHOD OF MAKING SAME
Filed Feb. 16, 1960    4 Sheets-Sheet 3

*INVENTOR.*
CHARLES F. SUDMAN
BY
*J. B. Holden*
ATTORNEY

March 12, 1963 C. F. SUDMAN 3,081,077
SEAT CUSHION AND METHOD OF MAKING SAME
Filed Feb. 16, 1960 4 Sheets-Sheet 4

INVENTOR.
CHARLES F. SUDMAN
BY
J. B. Holden
ATTORNEY

United States Patent Office 3,081,077
Patented Mar. 12, 1963

3,081,077
SEAT CUSHION AND METHOD OF MAKING SAME
Charles F. Sudman, Akron, Ohio, assignor to The Goodyear Tire & Rubber Company, Akron, Ohio, a corporation of Ohio
Filed Feb. 16, 1960, Ser. No. 9,139
14 Claims. (Cl. 267—111)

This invention relates to a seat construction comprising a seat frame including at least two relatively fixed spaced rails with a series of elongated, substantially inextensible but flexible strips attached to said rails, with some of said strips having one end thereof firmly anchored to one of the side rails and extending toward but having movement relative to the opposite side rail. The various strips extending from one rail are interposed between the strips projecting from the other rail as will be more fully explained hereinafter. These strips are embedded in a layer of rubber, either a solid rubber or a sponge rubber. Since the strips are only attached at one end, the strips may be deflected under the load on the rubber with the rubber between the adjacent strips supporting the load in shear as the free ends of the strips move generally parallel to each other during their deflection.

The advantage of using rubber in shear is that the resistance is distributed over a large area and there is no considerable amount of rebound after application of the load. With springs and such similar devices the rebound sometimes may be very annoying.

Other objects of this invention will appear hereinafter as the description thereof proceeds, the novel features, arrangements and combinations being clearly set forth in the description and in the appended claims.

In the drawings:

FIG. 1 is an isometric view of one form of a seat embodying this invention;

FIG. 2 is a cross-section taken along the line 2—2 of FIG. 1;

FIG. 3 is a similar view to that shown in FIG. 2 taken along the line 3—3 of FIG. 1;

FIG. 4 is a bottom plan view of a cushion with the strips molded therein before application of the cushion to the frame;

FIG. 5 is a cross-section through a mold showing the manner in which the rubber is molded about the strips;

FIG. 6 is a top plan view of the bottom part of the mold shown in FIG. 5 and taken along section 6—6 of FIG. 5;

FIG. 7 shows a modified form of the invention;

FIG. 8 is a cross-section taken along the line 8—8 of FIG. 7;

FIG. 9 is an isometric view of a solid rubber sheet with the strips embedded therein;

FIGS. 10 and 11 are views showing the method of embedding the metal strips in the rubber;

Figure 18:
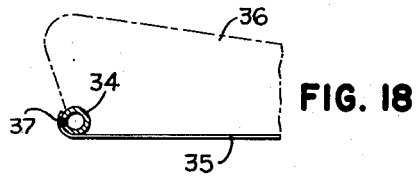
FIGS. 18 and 19 are views illustrating different ways of attaching the metal strips to a tubular frame.
Figure 15:
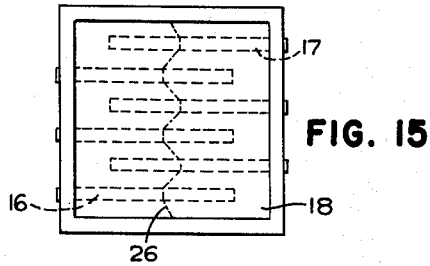
FIG. 15 is a bottom plan view of FIG. 14.
Figure 19:
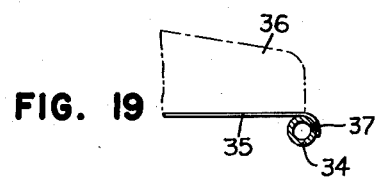

For the sake of simplicity, the invention, except as illustrated in FIGS. 18 and 19, is shown as being embodied in a seat construction in which the frame is of wood. As illustrated in FIGS. 1, 2, 3 and 4, the frame of the seat is indicated generally by the reference character 1 and this comprises front and rear rails 2 and 3 and end rails 4 and 5. A sponge rubber seat cushion 6 is molded to a series of metal strips 7 and 8 attached respectively to the front and rear rails 2 and 3. These strips are provided with openings 9 to permit some of the rubber to extend through the holes during the molding operation and to flow over the undersurfaces of the metal strips to form projections such as 10 illustrated in FIG. 2 to give a mechanical interlock between the rubber and the metal strips. However, the rubber is also bonded to the metal strips at all contacting points.

The metal strips 7 and 8 are fastened, as by nails 11 and 12 to the front and rear rails 2 and 3 respectively. As the load is applied to the seat, the adjacent strips create a shearing force in the sponge rubber arranged therebetween and the resistance to this force causes return of the form to its original position when the load is removed. Some types of sponge rubber may not be strong enough in shear to be suitable for supporting heavy loads but polyurethane sponge or foam rubber has a sufficiently high shear strength to provide satisfactory support for the cushion without becoming torn as a result of the shearing action.

In FIG. 4, there is illustrated a bottom plan view of a cushion made of sponge rubber with the metal strips 7 and 8 embedded therein and with the ends of these metal strips projecting from the front and rear edges of the cushion. These metal strips are preferably such as to be easily bent around the frame to thus enable the operator to attach the strips as shown in FIG. 1. While spring metal strips could be used it is preferable that they be of a ductile material. The seat cushion of FIG. 4 is placed over the frame and the ends are then bent over the adjacent edges of the frame 1 and nailed thereto. While metal strips are referred to and are preferable, it is also possible to use other flexible strips of an inextensible nature such as fabric belting, certain plastics or hard rubber. However, emphasis is placed on ductile metal strips as they can generally be provided at less cost. The metal is preferably a stainless steel to resist rusting and its surface should be clean to form a good bond with the sponge rubber.

In FIGS. 5 and 6 there is illustrated a simple method for embedding the strips in the sponge rubber. The mold is shown as comprising a bottom section 13 and a top section 14. The uncured sponge rubber is placed in the lower section and the metal strips are mounted at the opposite edges of the mold as illustrated in FIG. 6 with the spring clips 15 holding the strips in place. The top part of the mold 14 is then placed in position as in FIG. 5 and the sponge rubber is expanded and vulcanized. As the sponge rises in the mold it engages the strips 7 and 8 and portions extend through the openings 9 and during vulcanization becomes bonded to the strips to produce a seat cushion such as shown in FIGS. 2, 3 and 4.

As a modification of the invention, there is shown in FIGS. 7, 8 and 9 a similar but somewhat different form of the invention in which the metal strips 16 and 17 are molded into a sheet of solid rubber 38 which is intended to cover the entire frame 19 with the ends of the metal strips fastened by nails 20 to the front and back rails 21 and 22. The metal strips are similarly arranged as in the first form of the invention and the rubber between these strips takes the load in shear. Solid rubber has greater shear strength and will form a more adequate support for the cushion to be placed thereon. This cushion is illustrated at 23 and may be of any cushioning material although it is preferably made of a sponge rubber. The cushion is preferably adhered to the rubber sheet but may in some instances be a loose cushion. In automobile seat construction, it is preferable that the cushion be adhered to the rubber sheet 18. FIG. 8 is a cross-section showing the metal strips such as 16 embedded only partially in the rubber 18, so that the rubber forms a coating for the strips and also provides some resistance to flex cracking of the metal strips when laid against the rails of the frame.

FIGS. 10 and 11 show a simple method for embedding the metal strips in the rubber in order to form the sheet such as shown in FIG. 9. The rubber sheet 18 is placed on a lower platen 24 and the metal strips 16 and 17 are then laid in staggered relation on the rubber sheet 18. Then the upper platen 25 is brought down against the metal strips and by applying heat and pressure the metal strips are embedded in the rubber as illustrated in FIG. 11. Sufficient heat is provided to insure adequate bonding and vulcanizing. If it is necessary to treat the metal strips to get adequate bonding, this may be done in any well-known manner.

Figure 12:
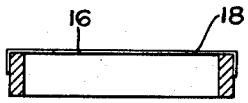
FIG. 12 is a cross-sectional view similar to FIG. 8 illustrating the manner in which the sheet shown in FIG. 9 is applied to the frame.
Figure 13:
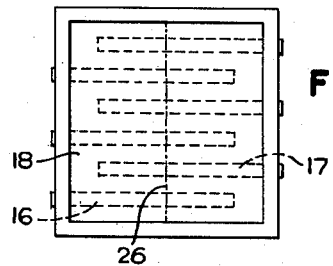
FIG. 13 is a bottom plan view of FIG. 12.

FIGS. 12, 13, 14 and 15 are merely schematic views illustrating the manner in which the rubber takes the load in shear. FIGS. 12 and 13 show a seat using the form of the invention shown in FIGS. 7, 8 and 9 with the seat unloaded. In FIG. 13, the dotted line 26 illustrates, for example, a chalk line drawn along the underside of the rubber and metal support while it is in the unloaded condition. Then, as the load is applied to the seat cushion, the combination sheet of metal and rubber is deflected as in FIG. 14, with the result illustrated in FIG. 15. The distortion of the chalk line under deflection illustrates how the all-rubber portions between the metal strips are subjected to shear.

Figure 16:
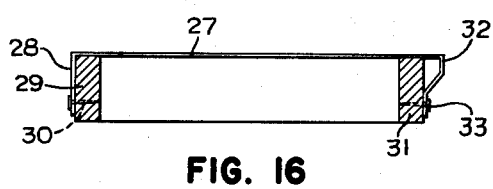
FIGS. 16 and 17 are sectional views similar to FIG. 12 showing a modification of the invention.
Figure 17:
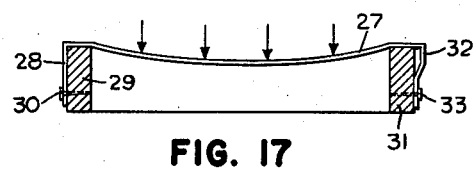
Figure 14:
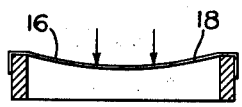
FIG. 14 is a view similar to FIG. 12 showing the deflection of the rubber under load.

In FIGS. 16 and 17, there is illustrated a modification of the invention wherein the supporting composite sheet 27 has the metal strips 28 snugly fitting the rail 29 and fastened thereto by a nail 30, whereas at the right this same metal strip is extended over the rail 31 and has a looped portion 32, the extreme end of which is fastened by a nail 33 to the rail 31. Thus, as illustrated in FIG. 17, when a load is applied, the loop 32 is shortened and, if an excessive load is applied to the cushion, the flat portion of the loop will engage the side of the rail and limit the amount of movement of the strip 27. In other words, the end of the strip 27 is not normally restrained, but a limiting means is provided to prevent too much deflection. Various other means may be employed to accomplish the same result.

In FIG. 18 there is shown a tubular rail 34 to which the metal strips 35 are attached as by spot welding at the point 37. Or the metal strip 35 may encircle the tubular strip 34 at the upper side as shown in FIG. 19 with the strip being welded to the rail 34 as at 37.

Figure 20:
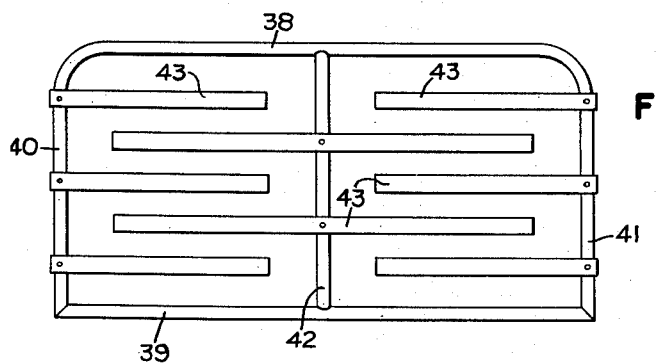
FIG. 20 illustrates the method of applying this invention to the back portion of a seat.
Figure 21:
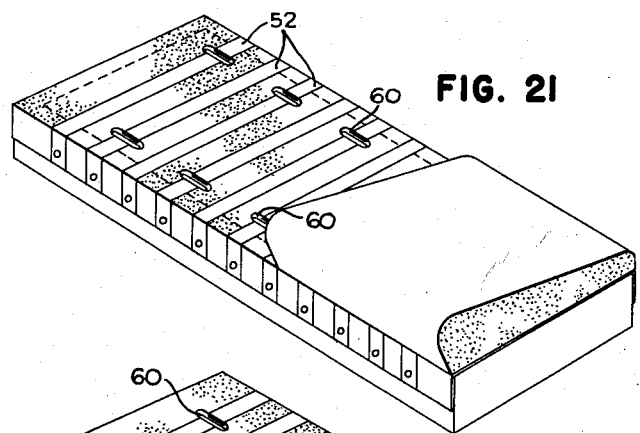
FIGS. 21 and 22 are isometric views illustrating a further embodiment of the invention.

In FIG. 20, there is shown a frame forming the back portion of an automobile seat or the like in which there is a tubular frame comprising the upper and lower rails 38 and 39, end rails 40 and 41 and a middle rail 42. The metal strips 43, whether embedded in a sponge or solid rubber construction extend alternately from one end toward the middle rail and from the center rail toward the end rails, instead of extending from the upper and lower rails since it is believed the latter arrangement is not as suitable for the back portion of a seat. However, the invention is capable of many variations as to the arrangement of these metal strips in order to secure the proper amount of support either for the seat cushion itself or for the back of the seat.

The form of the invention shown in FIGS. 7, 8 and 9 is a practical arrangement since the sheets such as shown in FIG. 9 can be made and used on a frame in place of the usual webbing, etc, and its application to the frame is very simple. However, to produce the sheet shown in FIG. 9 requires that individual lengths of the metal strips be mounted in staggered relation on the metal sheet before molding. This involves considerable manual effort and is time consuming. A more practical manner of producing the same result is shown in FIGS. 21 to 24 inclusive. In this form of the invention a continuous sheet of rubber is formed with continuous ribbons of metal embedded in the rubber. These metal strips are embedded in the rubber by a continuous process illustrated in FIG. 23 in which there is a large drum 44 and a smaller drum 45 over which is trained an endless steel belt 46 of considerable width. Similarly, the drums 47, 48 and 49 have an endless belt 50 trained thereover to follow a reverse curvature around the drum 44. The drum 44 is heated to a temperature sufficient to give the proper cure to the rubber and a sufficient pressure is exerted between the belts 50 and 46 to cause the metal strips to be embedded in the rubber. A roll of uncured rubber 51 and a series of rolls of narrow metal strips 52 are mounted respectively on the shafts 53 and 54 and the rubber sheet and the metal strips are fed into the bight between the belts 50 and 46 at 55.

Figure 22:
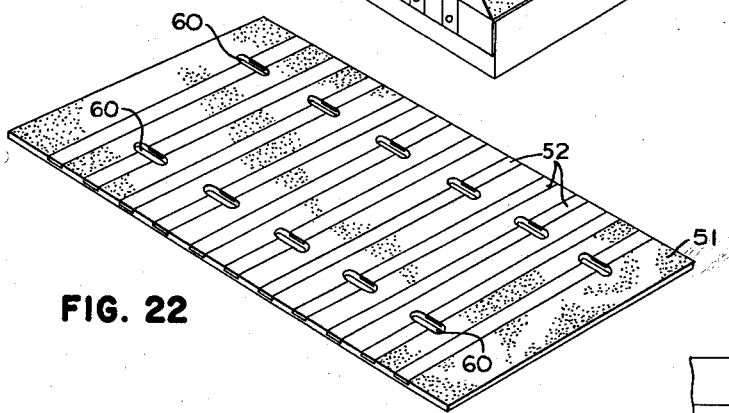
Figure 24:
FIG. 24 is a section looking in the direction of line 24—24 of FIG. 23.
Figure 23:
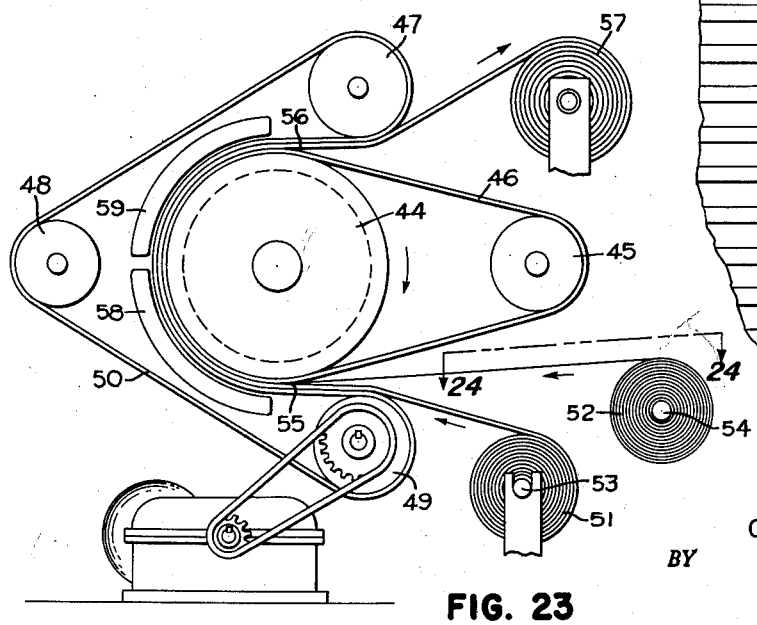
FIG. 23 is a vertical elevation showing schematically one method of applying the metal strips to the rubber.

As the rubber and metal travel around the drum 44 the metal is embedded in the rubber due to the pressure exerted between the belts 50 and 46, and as the combined strip emerges from between the belts 50 and 46 at the point 56, it is wound into a roll 57. At the outside of the belt 50, as it travels around the drum 44, there are provided a heated shoe or shoes 58 for assisting the curing operation and there are provided a similar shoe or shoes 59 which act to cool the belts and the rubber sheet just before emerging at the point 56. This provides a continuous method of applying the metal strips to the rubber, and after this has been done the composite layer may be cut into suitable lengths as illustrated in FIG. 22 and then generally oblong holes 60 are punched through each of the strips 52 and adjacent rubber near opposite ends of adjacent strips. Thus, each metal strip is cut into two parts, one of which is much longer than the other and this longer part corresponds to the strips shown in the form of the invention shown in FIG. 7. It will be noted that the ends of the strips are free to be deflected under load the same as in FIG. 7. This process of making the composite sheet results in a substantial saving in labor costs and assures greater uniformity since the strips may be guided positively in proper alignment while passing through the press illustrated in FIG. 23. When a metal frame is used and it is desired to weld the strips 7 and 8 thereto, the exposed metal surfaces may be placed against the frame or a portion of the rubber may be removed from the rubberized side of the metal strip to permit welding. If nails or screws are to be used either with a wood or metal frame, it is unnecessary to remove the rubber and the rubber side is preferably placed against the frame.

It is obvious that the spacing of the strips may be varied to suit load requirements and the spacing may be nonuniform if various portions of the cushion take different loads.

The term "rubber" as used in the specification, means natural and synthetic rubber as well as similar materials having similar deformation characteristics. The term "sponge rubber" is used in its generic sense and includes, except where otherwise indicated, natural and synthetic sponge rubber, blown sponge, and foam rubber.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. In a seat construction, the combination with a frame including a first rail and a second rail in spaced relation to each other, a first series of spaced generally parallel and substantially inextensible elongated members each anchored at one end to said first rail with the opposite end projecting toward the second rail but having permissible relative movement with respect thereto in a direction toward said first rail whereby to permit deflection thereof under load, a second series of similar elongated members similarly attached to said second rail and similarly projecting toward said first rail and having permissible relative movement with respect thereto, some of the elongated members of the first series being interposed between adjacent pairs of elongated members of the second series in overlapping relation, and a layer of rubber bonded to and connecting said members whereby when the elongated members are deflected under load and move generally parallel relative to each other due to being anchored to the rails at their one end, the rubber is placed in shear to sustain the load.

2. A seat construction as set forth in claim 1 in which the elongated members are perforated and the rubber extends into said perforation to form a mechanical bond between the said members and rubber.

3. A seat construction as set forth in claim 1 in which the ends of the elongated members having relative movement to a rail as aforesaid are provided with limiting means for limiting the amount of such relative movement to thus limit the deflection of the elongated members under load.

4. A seat construction as set forth in claim 3 in which the limiting means comprises a looped portion on the said ends having limited movement, with the end of the looped portion being attached to the adjacent rail to permit deflection of the elongated members to the extent provided by the looped portion.

5. A seat construction as set forth in claim 1 in which the one end of each said elongated members opposite to the end anchored to a rail extends toward the other rail sufficiently to overlap the rail.

6. A seat construction as set forth in claim 1 in which the one end of each said elongated members opposite to the end anchored to a rail extends toward the other rail a distance less than the spacing between said rails.

7. A seat construction as set forth in claim 1 in which the rubber is a solid rubber.

8. A seat construction as set forth in claim 1 in which the rubber is a foam rubber.

9. A seat construction as set forth in claim 1 in which the rubber is a polyurethane foam rubber.

10. In a seat construction, the combination with a pair of spaced rails, a load support comprising a layer of rubber spanning said rails and a plurality of generally parallel and substantially inextensible elongated members embedded in and bonded to said rubber, each said member having one end overlapping one of said rails and securely anchored thereto with the other end extending at least into close proximity with the other rail and interposed between adjacent ones of other adjacent elongated members anchored to the other rail.

11. A seat construction as set forth in claim 10 in which there is a cushion supported on said load support.

12. A seat construction as set forth in claim 10 in which a portion of said rubber is of a substantial thickness to form a resilient cushion.

13. As a new article of manufacture for use as a resilient support in furniture the combination of a rubber sheet, a plurality of inextensible generally parallel elongated members bonded to said sheet and arranged in two series with the members of one series interposed between adjacent members of the other series, the members of said one series extending from adjacent one edge of said sheet substantially to the opposite edge thereof and the members of the other series extending from adjacent said opposite edge substantially to said one edge, whereby when members of said one series are attached to only one of two spaced supports in an article of furniture and said members of said other series are attached to only the other of said spaced supports a load on said support will be resiliently supported by the action of rubber under shear resulting from the deflection of said members by said load.

14. The method of producing a seat-supporting web of the class described comprising the steps of providing a roll of unvulcanized rubber and supporting it for rotation adjacent a vulcanizing station, advancing the rubber from said roll in a continuous manner through said vulcanizing station, providing a plurality of laterally spaced rolls of elongated substantially inextensible material adjacent the path of travel of said rubber, withdrawing the inextensible material in said rolls as said rubber is advanced and superimposing said withdrawn material on said rubber to form strips of material thereon arranged in spaced generally parallel relation to each other as said rubber is advanced to said vulcanizing station, applying heat and pressure at said station to unite said inextensible material and rubber and vulcanize the rubber, cutting said composite web transversely into strips of desired lengths to produce sheets each having strips of inextensible material extending from edge to edge thereof in generally spaced parallel relation, and then severing said strips in a sheet intermediate their ends to make them discontinuous, some of said strips in a sheet being severed closely adjacent one edge thereof with intermediate strips being severed closely adjacent the opposite edge thereof.

References Cited in the file of this patent

UNITED STATES PATENTS

| | | |
|---|---|---|
| 109,852 | Valkmar | Dec. 6, 1870 |
| 2,202,615 | Barenyi | May 28, 1940 |
| 2,231,346 | Reising et al. | Feb. 11, 1941 |
| 2,456,923 | Gogovan et al. | Dec. 21, 1948 |
| 2,459,758 | Flint | Jan. 18, 1949 |
| 2,539,690 | Boorn | Jan. 30, 1951 |
| 2,545,513 | Emberson | Mar. 20, 1951 |
| 2,688,581 | Stubbs | Sept. 7, 1954 |
| 2,816,853 | Myers | Dec. 17, 1957 |
| 2,865,436 | Thorne | Dec. 23, 1958 |
| 2,878,494 | Healy | Mar. 24, 1959 |
| 2,897,879 | Brown et al. | Aug. 4, 1959 |

FOREIGN PATENTS

| | | |
|---|---|---|
| 323,224 | Great Britain | Dec. 27, 1929 |